Dec. 5, 1939.   F. M. WIBERG   2,182,009
METHOD OF REDUCING ORE, PARTICULARLY IRON ORE
Filed March 21, 1939
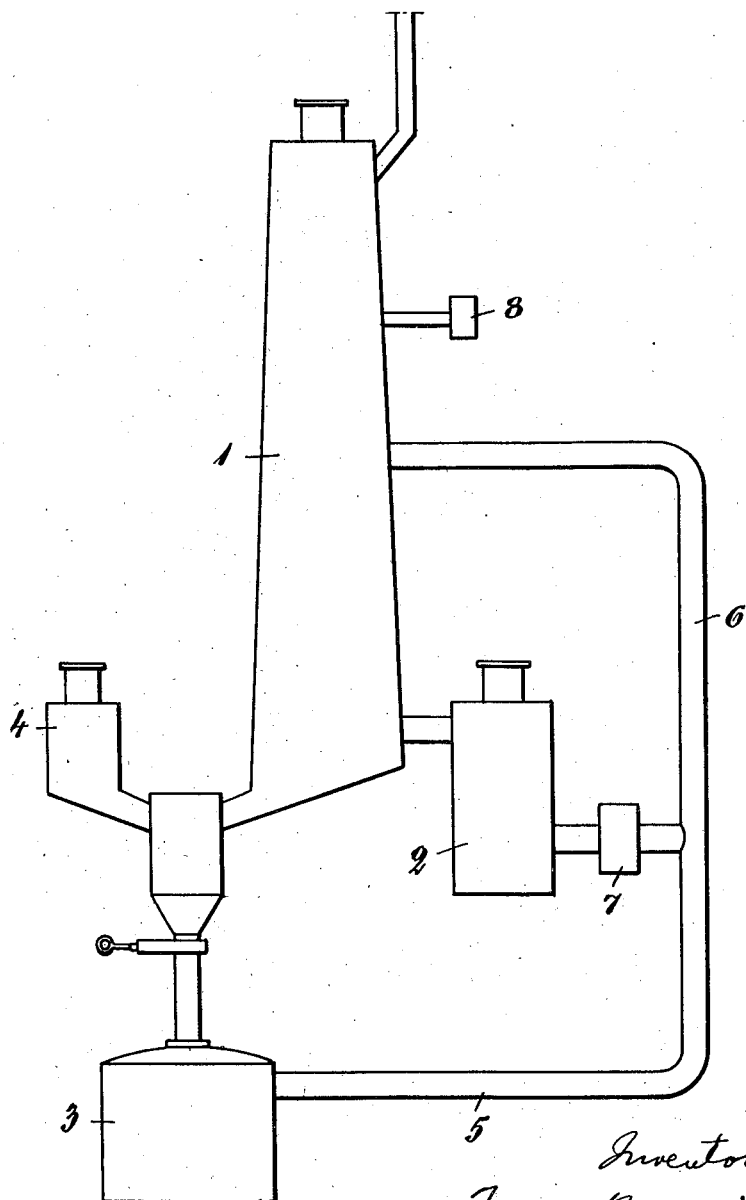
Inventor
Frans Martin Wiberg
by Dorsey Cole & Garner
his Attorneys Patented Dec. 5, 1939

2,182,009

UNITED STATES PATENT OFFICE 2,182,009

METHOD OF REDUCING ORE, PARTICULARLY IRON ORE

Frans Martin Wiberg, Filipstad, Sweden, assignor to Det norske Aktieselskab for Elektrokemisk Industri, Oslo, Norway Application March 21, 1939, Serial No. 263,231
In Sweden November 11, 1937

1 Claim. (Cl. 75—40)

Applicant has previously proposed a method for the reduction of oxide ores, particularly iron ores, according to which the reduction is effected by means of a carbon monoxide-containing gas flowing in a direction opposed to that of the ore, the flow of gas being divided, prior to having passed through the whole of the body or mass of ore, in a manner such that a portion thereof is taken out of the reduction furnace and is regenerated with respect to carbon monoxide by reduction with carbon in a so-called carburetter, and is again supplied to the furnace as a reducing gas, while the remainder is permitted to continue through the whole body or mass of ore to exert a further reducing effect on the latter at a temperature suitable for the reduction, such temperature being produced through combustion of the combustible constituents remaining in said rest after the reduction (see the U. S. A. Patent No. 1,401,222).

In the practical performance of this known method many difficulties have been encountered, which have limited the employment of the method. If the spongy iron obtained in the reduction of the ore is to be melted in an electric steel furnace or in an open-hearth furnace, it should hold a percentage of iron as high as possible to avoid too large quantities of slag in the melting procedure. Therefore, only rich ores or such that, after having been reduced, may be readily concentrated by magnetic means can be brought into use for economical reasons. Furthermore, the ore should be reduced as completely as possible, in order that the spongy iron obtained should be as pure as possible. This requires a comparatively long reduction period and so high a temperature that operating difficulties may ensue thereby. Moreover, the reduction gas employed should hold a percentage of carbon dioxide as low as possible, which places great demands on the construction and maintenance of the carburetter. To obtain a low percentage of sulphur in the spongy iron produced the fuel used in the carburetter should either be as free as possible from sulphur, or a lime filter should be connected between the carburetter and the reduction furnace, which makes the plant complicated and causes an increase of the heat losses. In the reduction of ore in pieces in a shaft furnace a certain quantity of ore dust must, as a rule, be sifted off prior to the reduction, and be subjected to sintering or some other treatment to bring it into the form of pieces, which also increases the manufacturing cost of the spongy iron.

All of these difficulties are avoided according to the present method which differs from the above mentioned known method therein that the ore is subjected only to a partial reduction (pre-reduction) with a carbon monoxide-containing gas in the reduction furnace, whereupon it is finally reduced in a second furnace by being melted there together with solid carbonaceous reduction agent, the gas escaping from said second furnace, or a portion thereof, being conducted, preferably together with the gas taken out from the pre-reduction furnace, through one or more carburetters, the regenerated gas mixture being then used for the pre-reduction of the ore in the first mentioned furnace.

By adapting the quantity of solid reducing agent added for effecting the final reduction, it should be possible in the melting procedure to obtain either pig iron or steel. Especially when treating poor ores, it is believed to be advantageous in the melting process to produce pig iron, inasmuch as the slag may then be separated at a lower temperature and it being possible to obtain a more complete reduction of the iron from the slag. By the use of a suitable slag composition it is possible also, in effecting melting to pig iron, to obtain a considerable desulphurisation, whereby a sulphur containing fuel, such as coke, may be used both in the final reduction furnace and in the carburetter, without any lime filter having to be connected between the carburetter and the pre-reduction furnace.

By carrying the partial or pre-reduction by means of gas only to a low reduction degree of the ore, the advantage is obtained that the requisite reduction period is considerably shortened and that the required reduction temperature is reduced. Furthermore, the reduction may be effected by means of a gas which is richer in carbon dioxide than according to the above mentioned known method, whereby the carburetter may be operated with a lower temperature, which simplifies its construction and increases the safety in operation thereof. The quantity of gas which has to pass through the carburetter also becomes considerably less, which reduces the gas pressure required and increases the safety in operation of the fan used for the gas circulation.

If the second furnace for effecting the combined final reduction and melting is of suitable construction, it may also operate with dust-like materials, and a reducing agent of second quality, such as coke breeze, may therefore be brought into use in the final reduction process. Moreover, the advantage is obtained that the dust which must be sifted off the ore, in order that the latter shall permit of being reduced with gas in a shaft furnace, may be supplied directly to the second furnace where the final reduction is effected without any previous sintering or briquetting. If desired, a portion of the ore or ore dust supplied to the furnace of final reduction may have been pre-reduced in some other way than according to the above mentioned known method.

The accompanying drawing illustrates diagrammatically a form of embodiment of a plant for carrying the present method into effect. The pre-reduction furnace, wherein a partial pre-reduction of the ore is effected, is designated by 1. Before the gas stream has passed through the whole of the body or mass of the ore in the pre-reduction furnace, a portion of the same is taken out through the conduit 6 and is supplied by means of a fan 7 to a carburetter 2, wherein the gas is regenerated with respect to carbon monoxide, and is again supplied to the lower part of the pre-reduction furnace. The remaining portion of the gas, which continues upwardly through the furnace, has a further reducing effect, whereupon it is combusted by means of air for the heating of the ore, said air being introduced with the aid of the fan 8. The ore which is partially reduced in the pre-reduction furnace is then conveyed, with or without previous cooling, to a furnace 3 for final reduction, wherein it is melted and finally reduced by means of some solid carbonaceous reducing agent which is supplied from a container 4. The gas obtained in the final reduction furnace 3, which substantially consists of carbon monoxide, is conducted through the conduit 5 to the carburetter 2, it being then preferably brought together with the circulation gas coming from the pre-reduction furnace 1 prior to passing through the fan 7.

Although the pre-reduction furnace has been shown here as a shaft furnace, it is obvious that other forms of furnaces may also be made use of.

I claim:

Method of reducing ores, particularly iron ore, comprising the steps of causing the ore to pass through a furnace in opposite direction to carbon monoxide containing reducing gas, taking out a portion of said gas before it has continued through the whole body of ore, leading said portion of gas through at least one carburetter for regenerating the same with respect to carbon monoxide and utilizing the same as reducing agent in said furnace, causing the rest of the gases to continue through the body of ore and supplying air to the same for effecting the required reduction temperature, leading the process in said furnace so that only a partial reduction of the ore is effected, introducing said partially reduced ore together with solid reducing agent into a second furnace, where it is melted and completely reduced, and leading at least one portion of the gases generated in said second furnace through said carburetter together with the portion of gases taken out from the first mentioned furnace for assisting the reduction process in said furnace.

FRANS MARTIN WIBERG.